United States Patent
Sim

(10) Patent No.: US 9,578,668 B2
(45) Date of Patent: *Feb. 21, 2017

(54) BLUETOOTH PAIRING SYSTEM AND METHOD

(71) Applicant: Hyundai Motor Company, Seoul (KR)

(72) Inventor: Hyun Chul Sim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 29 days.

This patent is subject to a terminal disclaimer.

(21) Appl. No.: 14/566,627

(22) Filed: Dec. 10, 2014

(65) Prior Publication Data

US 2016/0057790 A1    Feb. 25, 2016

(30) Foreign Application Priority Data

Aug. 25, 2014 (KR) .......................... 10-2014-0110940

(51) Int. Cl.
H04B 5/00 (2006.01)
H04W 76/02 (2009.01)
H04W 4/00 (2009.01)
H04W 84/18 (2009.01)

(52) U.S. Cl.
CPC ........... *H04W 76/023* (2013.01); *H04W 4/008* (2013.01); *H04W 84/18* (2013.01)

(58) Field of Classification Search
CPC .................................. H04W 4/008; H04B 5/00
See application file for complete search history.

(56) References Cited

U.S. PATENT DOCUMENTS

| | | | |
|---|---|---|---|
| 6,862,724 B1* | 3/2005 | Riley | G06F 9/4411 326/39 |
| 8,959,267 B2* | 2/2015 | Kang | G06F 13/14 710/2 |
| 2005/0268084 A1* | 12/2005 | Adams | G06F 1/24 713/2 |
| 2008/0016368 A1* | 1/2008 | Adams | H04L 63/0853 713/183 |
| 2008/0117847 A1* | 5/2008 | Hamada | H04W 28/18 370/310 |
| 2010/0087137 A1 | 4/2010 | Fischer et al. | |
| 2010/0294835 A1* | 11/2010 | Bam | G06Q 20/28 235/382 |
| 2011/0063098 A1 | 3/2011 | Fischer et al. | |

(Continued)

FOREIGN PATENT DOCUMENTS

CN      103763008 A  *  4/2014
KR   10-2010-0051900 A      5/2010

(Continued)

*Primary Examiner* — Cindy Trandai

(74) *Attorney, Agent, or Firm* — Mintz Levin Cohn Ferris Glovsky and Popeo, P.C.; Peter F. Corless

(57) ABSTRACT

A Bluetooth pairing method is provided which includes connecting a mobile terminal and an infotainment system of a vehicle by a wired connection. The method also includes executing a dedicated APP (application) for a Bluetooth pairing disposed in the mobile terminal by a controller disposed in the infotainment system. Information regarding the infotainment system for the Bluetooth pairing is transmitted to the dedicated APP by the controller and the information is stored to a NFC (Near Field Communication) tag by the dedicated APP.

15 Claims, 3 Drawing Sheets

(56) References Cited

U.S. PATENT DOCUMENTS

| | | | | |
|---|---|---|---|---|
| 2011/0093153 A1* | 4/2011 | Moinzadeh | G06F 8/60 | 701/31.4 |
| 2011/0219105 A1* | 9/2011 | Kryze | G06F 15/16 | 709/223 |
| 2011/0257973 A1* | 10/2011 | Chutorash | G01C 21/3661 | 704/235 |
| 2012/0077584 A1* | 3/2012 | Sarmenta | A63F 13/06 | 463/31 |
| 2012/0095642 A1* | 4/2012 | Nishida | H04L 9/3226 | 701/31.4 |
| 2012/0254960 A1* | 10/2012 | Lortz | H04L 63/104 | 726/7 |
| 2013/0305218 A1* | 11/2013 | Hirsch | G06F 8/36 | 717/106 |
| 2014/0080544 A1* | 3/2014 | Chen | H04M 1/72527 | 455/557 |
| 2014/0107886 A1* | 4/2014 | Miljkovic | G07C 5/008 | 701/29.6 |
| 2014/0173037 A1* | 6/2014 | Beddow | H04L 67/06 | 709/219 |
| 2014/0187149 A1* | 7/2014 | Lortz | H04W 4/008 | 455/41.1 |
| 2014/0194056 A1* | 7/2014 | Barrett | H04M 1/6091 | 455/41.1 |
| 2014/0213243 A1* | 7/2014 | Noh | H04L 12/281 | 455/419 |
| 2014/0224867 A1* | 8/2014 | Werner | G06Q 30/0623 | 235/375 |
| 2014/0256260 A1* | 9/2014 | Ueda | H04W 76/023 | 455/41.2 |
| 2014/0298353 A1* | 10/2014 | Hsu | G06F 9/54 | 719/313 |
| 2015/0038073 A1* | 2/2015 | Vang | H04W 76/02 | 455/41.1 |
| 2015/0065049 A1* | 3/2015 | Heo | H04B 7/2612 | 455/41.2 |
| 2015/0099470 A1* | 4/2015 | Lee | H04W 76/023 | 455/41.2 |
| 2015/0263790 A1* | 9/2015 | Chein | H04B 5/0031 | 455/41.1 |
| 2016/0162271 A1* | 6/2016 | Zhi | G06F 8/71 | 717/175 |

FOREIGN PATENT DOCUMENTS

| | | |
|---|---|---|
| KR | 10-2012-0066051 A | 6/2012 |
| KR | 10-2012-0069262 A | 6/2012 |
| KR | 10-2012-0095867 A | 8/2012 |
| KR | 10-1241293 B1 | 3/2013 |
| KR | 10-2013-0102149 A | 9/2013 |

* cited by examiner

BLUETOOTH PAIRING SYSTEM AND METHOD

CROSS-REFERENCE TO RELATED APPLICATION(S)

Pursuant to 35 U.S.C. §119(a), this application claims priority to Korean Patent Application No. 10-2014-0110940, filed on Aug. 25, 2014, the disclosure of which is incorporated herein in its entirety by reference.

BACKGROUND

Field of the Invention

The present invention relates to a Bluetooth pairing method and system, and more particularly, to a Bluetooth pairing method storing the relevant pairing information of a pairing target device to a NFC (Near Field Communication) tag.

Discussion of the Related Art

Since speaking on a telephone while driving may distract a driver, a hands-free phone call has been widely used for enabling the driver to concentrate on driving. Early developed hands-free devices were hardwired and mounted to a mobile phone holder. However, in recent years, Bluetooth technology has been used with mobile phones to enable hands-free phone calling while driving and even while leaving the mobile phone in a bag or pocket.

Bluetooth is a technology based on an IEEE standard, 802.15.1 for short-range wireless communication technology, and Bluetooth technology allows electronic devices such as a wireless terminal located within about 10 m of, for example, a computer, a cell phone, a headset, a personal digital assistant (PDA), a printer, a mouse, a keyboard or the like to wirelessly communicate with each other and requires low cost and low power. In general, Bluetooth hands-free technology allows for the output of an audio signal transmitted from a paired device (e.g., a mobile phone or MP3 player) through a speaker disposed within a vehicle. As another example, Bluetooth technology allows for the transmission of a user's voice signal input through a microphone disposed within a vehicle to a mobile phone when a call function of the mobile phone is used. In particular, a typical Bluetooth pairing procedure between a head unit of a vehicle and a mobile terminal of a user is complex. For example, pairing can be set through a procedure requiring more than about 6 steps. Accordingly, pairing between a head unit of a vehicle a mobile terminal is typically complex, and accordingly, such complications hinder a user's ability to pair a device in a vehicle.

SUMMARY

An object of the present invention is to provide a Bluetooth pairing method and system for pairing a target device by obtaining relevant pairing information capable of specifying a target device for Bluetooth pairing through a first single wired connection, and storing the obtained relevant pairing information to a NFC tag.

A Bluetooth pairing method according to an exemplary embodiment of the present invention may include: connecting, by a wired connection, a mobile terminal and an infotainment system of a vehicle; executing a dedicated application (APP) for a Bluetooth pairing disposed in the mobile terminal by a controller disposed within the infotainment (information and entertainment) system; transmitting, by the controller, information regarding the infotainment system for the Bluetooth pairing to the dedicated APP; and storing the information to a NFC (Near Field Communication) tag by the dedicated APP. In an exemplary embodiment, in the connection using a wired connection, the mobile terminal and the infotainment system may be connected via USB (Universal Serial Bus). In an exemplary embodiment, the information regarding the infotainment system for the Bluetooth pairing may include a Media Access Control (MAC) address of the infotainment system or information for a Bluetooth module disposed in the infotainment system.

In addition after the mobile terminal and the infotainment system of a vehicle are connected by a wired connection, the method may further include: determining, by the controller, whether the dedicated APP for the Bluetooth pairing is provided to the mobile terminal; and transmitting and installing, by the controller, the dedicated APP to the mobile terminal, in response to determining that the dedicated APP is not provided to the mobile terminal. In an exemplary embodiment, after the storing of the information to the NFC tag by the dedicated APP, the method may further include: activating by a NFC function of the mobile terminal; tagging, by the controller, the mobile terminal to the NFC tag storing the information; obtaining, by the controller, the information via the tagging by the mobile terminal; and executing, by the controller, a connection screen for the Bluetooth pairing based on the obtained information by the mobile terminal.

The connection screen may include a screen on which the information regarding the infotainment system may be displayed, so that the infotainment system and the mobile terminal are Bluetooth paired as a result of a selection using a mobile terminal. The Bluetooth pairing method according to the present invention may pair a target device by obtaining relevant pairing information capable of specifying the target device of the Bluetooth pairing through a first single wired connection, and storing the obtained relevant pairing information to a NFC tag.

A Bluetooth pairing system according to an exemplary embodiment of the present invention may include a memory configured to store program instructions; and a processor configured to execute the program instructions, the program instructions when executed may be configured to: recognize a wired connection of a mobile terminal and an infotainment system of a vehicle; transmit a dedicated application (APP) for Bluetooth pairing disposed in the mobile terminal, wherein the controller is disposed in the infotainment system; transmit information regarding the infotainment system for the Bluetooth pairing to the dedicated APP. The program instructions when executed may be further configured to cause the dedicated APP to store the information to a Near Field Communication (NFC) tag. The wired connection may include the mobile terminal and the infotainment system connected via Universal Serial Bus (USB). The information of the infotainment system for the Bluetooth pairing may include a Media Access Control (MAC) address of the infotainment system or information for a Bluetooth module provided in the infotainment system. When the mobile terminal and the infotainment system of a vehicle are connected by a wired connection, the program instructions when executed may be further configured to determine whether the dedicated APP for the Bluetooth pairing is provided to the mobile terminal by the controller and transmit and install the dedicated APP to the mobile terminal, in response to determining that the dedicated APP is not provided to the mobile terminal. After the storing of the information to the NFC tag by the dedicated APP, the program instructions when executed may be further configured to activate a NFC function of the mobile terminal, tag the mobile terminal to the NFC tag storing the information, obtain the information by the tagging by the mobile terminal and execute a connection screen for the Bluetooth pairing based on the obtained information by the mobile terminal. According to exemplary embodiments of the present invention, the connection screen may be a screen on which the information of the infotainment system is displayed, so that the infotainment system and the mobile terminal are Bluetooth paired as a result of a selection made using a mobile terminal.

BRIEF DESCRIPTION OF THE DRAWINGS

The drawings are provided for reference in describing exemplary embodiments of the present invention, and the spirit of the present invention should not be construed only by the accompanying drawings. The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
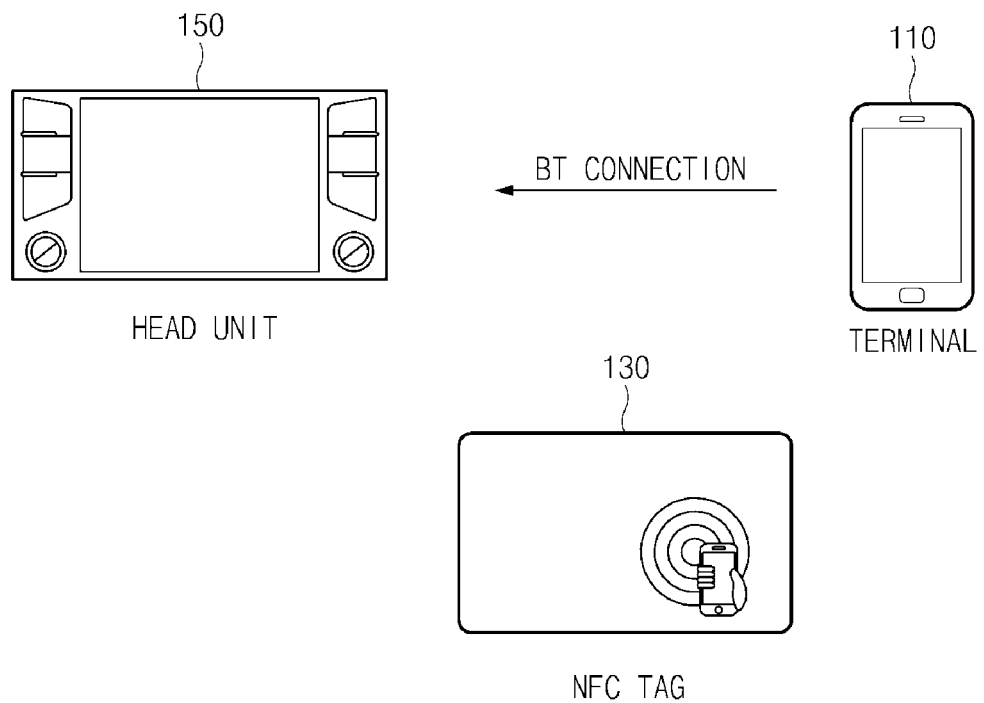
FIG. 1 is an exemplary diagram showing a head unit of a vehicle and a mobile terminal, in a Bluetooth pairing method according to an exemplary embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Hereinafter, with reference to the drawings, an exemplary embodiment of the present invention will be described in detail. FIG. 1 is an exemplary diagram showing a head unit of a vehicle and a mobile terminal in a Bluetooth pairing method according to an exemplary embodiment of the present invention. Referring to FIG. 1, a head unit 150 of a vehicle is shown as an infotainment system of a vehicle, and a smart phone 110 is shown as a mobile terminal. However, the head unit of a vehicle is not limited only to the infotainment system of a vehicle and the mobile terminal is not limited only to a smart phone, and the above examples are used merely for explanation.

According to an exemplary Bluetooth pairing method, the smart phone 110 may be connected with the head unit 150 which may be a pairing target device used with Bluetooth pairing, by approaching substantially near to one another, and tagging the NFC tag disposed in the vehicle. The NFC tag may be configured to store the relevant pairing information of the head unit 150, which is a Bluetooth pairing target device. Hereinafter, the process for storing the relevant pairing information of the head unit 150 which is a pairing target device to the NFC tag will be described.

Figure 2:
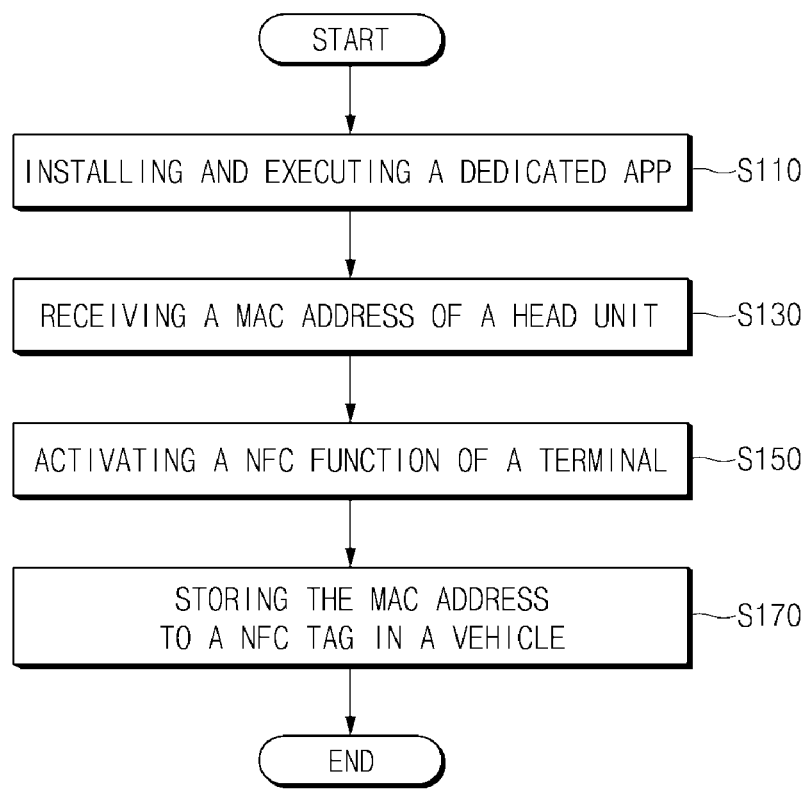
FIG. 2 is an exemplary diagram showing a procedure which obtains a MAC address of a head unit and stores it to a NFC tag, in a Bluetooth pairing method according to an exemplary embodiment of the present invention.

FIG. 2 is an exemplary diagram showing a procedure for obtaining a MAC address of a head unit and storing the MAC address to an NFC tag, using a Bluetooth pairing method according to an exemplary embodiment of the present invention.

Referring to FIG. 2, a Bluetooth pairing method may include S110 to S170, as discussed below. First, a dedicated APP (application) for Bluetooth pairing disposed (installed) in the smart phone may be executed (S110). The dedicated APP may be an APP which may execute Bluetooth pairing between the smart phone and a Bluetooth module (not shown) disposed in the head unit. When the smart phone is connected with the head unit by a wired connection, the dedicated APP disposed in the smart phone may be automatically executed by a controller disposed in the head unit. Additionally, the execution of the dedicated APP disposed in the smart phone may be automatically performed by the smart phone through the activation of the NFC function of the smart phone. The wired connection may be via a Universal Serial Bus (USB) connection.

Further, the controller may be configured to determine whether the dedicated APP for Bluetooth pairing to the smart phone is disposed, and as the result of the determination, when the dedicated APP for a Bluetooth pairing is not disposed in the smart phone, the controller may be configured to transmit the dedicated APP for Bluetooth pairing to the smart phone via the wired connection, and then the transmitted, dedicated APP may be installed in the smart phone.

When the dedicated APP for Bluetooth connection is installed and executed in the smart phone S110, the controller may be configured to transmit the information of the head unit required for a Bluetooth connection to the smart phone. In other words, the dedicated APP of the smart phone may be configured to receive the information regarding the head unit from the head unit (S130). The information regarding the head unit required for Bluetooth connection may include the Media Access Control (MAC) address of the head unit or the information for the Bluetooth module disposed in the head unit. The dedicated APP or the NFC function provided to the smart phone via the controller may then be activated (S150).

The dedicated APP provided and executed in the smart phone may be configured to store the information regarding the head unit for Bluetooth pairing received in S130 to the NFC tag provided in the vehicle (S170). In other words, through S170, the NFC tag provided in the vehicle may be configured to store the required information to pair the head unit disposed in the vehicle using Bluetooth. Accordingly, the Bluetooth pairing method according to the present invention my include obtaining by the NFC tag storing the information regarding the head unit for pairing from S110 to 170, and after the above wired connection is completed, by the operation tagging the smart phone to the NFC tag storing the information, the head unit and the smart phone may be paired using Bluetooth.

Figure 3:
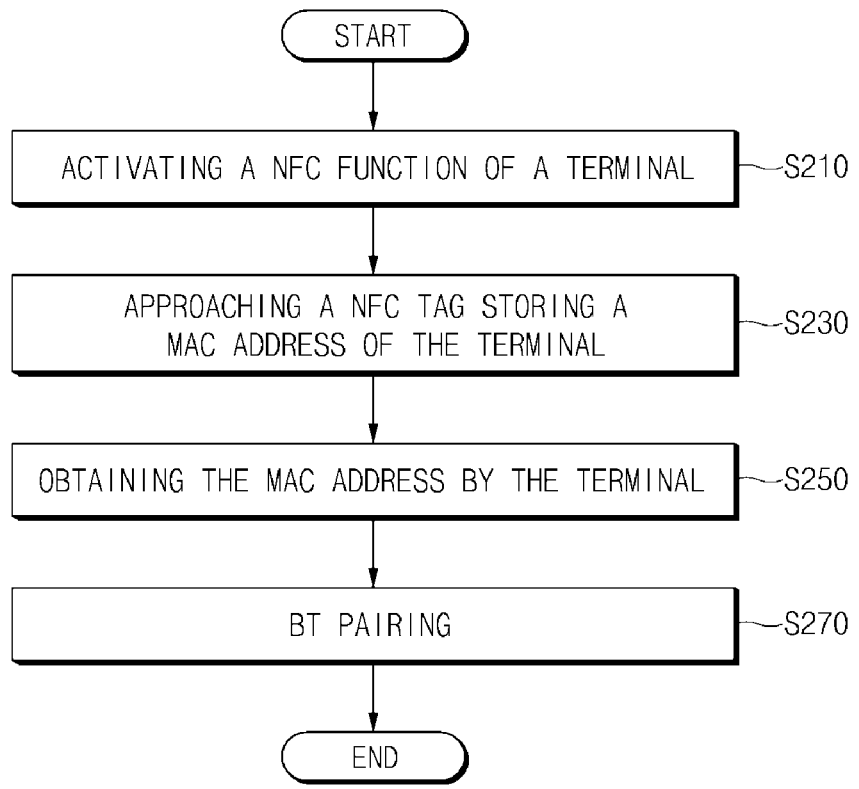
FIG. 3 is an exemplary diagram showing a procedure which a Bluetooth pairing is performed by using a NFC tag storing the relevant pairing information of the pairing target device, in a Bluetooth pairing method according to an exemplary embodiment of the present invention.

FIG. 3 is an exemplary diagram showing a procedure for performing Bluetooth pairing using an NFC tag storing the relevant pairing information regarding the pairing target device, according to an exemplary Bluetooth pairing method according to an exemplary embodiment of the present invention. Referring to FIG. 3, the Bluetooth pairing method may include S210 to S270. At first, the smart phone and head unit are not yet connected by a wired connection. Such a non-paired state may occur after a predetermined time has elapsed after performing S170, which is illustrated in FIG. 1.

First, the NFC function provided in the smart phone may be activated (S210). The activation of the NFC function may be performed by a smart phone user. The smart phone may then be approached and tagged to the NFC tag storing the information regarding the head unit for a Bluetooth pairing such as a MAC address (S230). By this tagging, the information regarding the head unit stored in the NFC tag may be transmitted to the smart phone. After that, through the tagging of S230, the smart phone may be configured to obtain the MAC address of the head unit (S250).

The smart phone may automatically execute a connection screen for Bluetooth pairing with the head unit based on the information regarding the head unit for the Bluetooth pairing obtained in S250. The connection screen may be a display screen configured to expose and output the information regarding the head unit to the user to pair, using Bluetooth, the head unit and the smart phone by a selection (e.g., one-time touch input) performed, for example, by a user of the smart phone. In addition, through the operation of the executed connection screen, the smart phone and the head unit may become Bluetooth paired (S270). The Bluetooth pairing method according to the present invention may be configured to obtain the information regarding the Bluetooth pairing target device through the wired connection, and store the obtained information to the NFC tag. After that, the mobile terminal may be Bluetooth paired with the target device by tagging the mobile terminal to the NFC tag storing the information, without a separate wired connection or passing through a complex process for Bluetooth pairing with the target device.

In the above description, the present invention has been described through specific examples, but it may be well understood that various modifications can be made without departing from the scope of the present invention. Therefore, the scope of the present invention is not limited to the above described exemplary embodiments, and it should be defined by the appended claims and their equivalents. When taking the foregoing description into account, if the modifications and variations of the present invention fall within the following claims and their equivalents, then it is construed that the present invention includes these modifications and variations.

What is claimed is:

1. A Bluetooth pairing method, comprising:
   connecting, using a wired connection, a mobile terminal and an infotainment system of a vehicle;
   transmitting, by a controller, a dedicated application (APP) for Bluetooth pairing disposed in the mobile terminal;
   transmitting, by the controller, information regarding the infotainment system for the Bluetooth pairing to the mobile terminal in which the dedicated APP is disposed; and
   storing, by the mobile terminal, the information to a Near Field Communication (NFC) tag,
   wherein, when the mobile terminal and the infotainment system of the vehicle are connected by the wired connection, the method further comprises:
      determining, by the controller, whether the dedicated APP for Bluetooth pairing is provided to the mobile terminal by the controller; and
      transmitting and installing, by the controller, the dedicated APP to the mobile terminal via the wired connection in response to determining that the dedicated APP is not provided to the mobile terminal.

2. The Bluetooth pairing method according to claim 1, wherein in the connecting by a wire connection, the mobile terminal and the infotainment system are connected via a Universal Serial Bus (USB).

3. The Bluetooth pairing method according to claim 1, wherein the information of the infotainment system for the Bluetooth pairing includes a Media Access Control (MAC) address of the infotainment system or information for a Bluetooth module disposed in the infotainment system.

4. The Bluetooth pairing method according to claim 1, wherein after the storing of the information to the NFC tag by the dedicated APP, the method further comprises:
   activating, by the controller, a NFC function of the mobile terminal;
   tagging, by the controller, the mobile terminal to the NFC tag that stores the information;
   obtaining, by the controller, the information by the tagging by the mobile terminal; and
   executing, by the controller, a connection screen for the Bluetooth pairing based on the obtained information by the mobile terminal.

5. The Bluetooth pairing method according to claim 4, wherein the connection screen is a screen on which the information regarding the infotainment system is displayed, to Bluetooth pair the infotainment system and the mobile terminal as a result of a selection using a mobile terminal.

6. A non-transitory computer readable medium containing program instructions executed by a processor for Bluetooth pairing, the computer readable medium comprising:
program instructions that recognize a wired connection of a mobile terminal and an infotainment system of a vehicle;
program instructions that transmit a dedicated application (APP) for Bluetooth pairing provided in the mobile terminal;
program instructions that transmit information regarding the infotainment system for the Bluetooth pairing to the mobile terminal in which the dedicated APP is disposed; and
program instructions that store, by the mobile terminal, the information to a Near Field Communication (NFC) tag,
wherein, when the mobile terminal and the infotainment system of the vehicle are connected by the wired connection, the computer readable medium further comprises:
program instructions that determine whether the dedicated APP for Bluetooth pairing is provided to the mobile terminal; and
program instructions that transmit and install the dedicated APP to the mobile terminal via the wired connection in response to determining that the dedicated APP is not provided to the mobile terminal.

7. The non-transitory computer readable medium according to claim 6, wherein the wired connection includes the mobile terminal and the infotainment system connected via a Universal Serial Bus (USB).

8. The non-transitory computer readable medium according to claim 6, wherein the information of the infotainment system for the Bluetooth pairing includes a Media Access Control (MAC) address of the infotainment system or information for a Bluetooth module disposed in the infotainment system.

9. The non-transitory computer readable medium according to claim 6, wherein after the storing of the information to the NFC tag by the dedicated APP, the computer readable medium further comprises:
program instructions that activate a NFC function of the mobile terminal;
program instructions that tag the mobile terminal to the NFC tag that stores the information;
program instructions that obtain the information by the tagging by the mobile terminal; and
program instructions that execute a connection screen for the Bluetooth pairing based on the obtained information by the mobile terminal.

10. The non-transitory computer readable medium according to claim 9, wherein the connection screen is a screen on which the information regarding the infotainment system is displayed, to Bluetooth pair the infotainment system and the mobile terminal as a result of a selection made using a mobile terminal.

11. A system for Bluetooth pairing, comprising:
a memory configured to store program instructions; and
a processor configured to execute the program instructions, the program instructions when executed configured to:
recognize a wired connection of a mobile terminal and an infotainment system of a vehicle;
transmit a dedicated application (APP) for Bluetooth pairing provided in the mobile terminal;
transmit information regarding the infotainment system for the Bluetooth pairing to the mobile terminal in which the dedicated APP is disposed; and
cause the mobile terminal to store the information to a Near Field Communication (NFC) tag,
wherein, when the mobile terminal and the infotainment system of the vehicle are connected by the wired connection, the program instructions when executed are further configured to:
determine whether the dedicated APP for the Bluetooth pairing is provided to the mobile terminal; and
transmit and install the dedicated APP to the mobile terminal via the wired connection in response to determining that the dedicated APP is not provided to the mobile terminal.

12. The system for Bluetooth pairing according to claim 11, wherein the wired connection includes the mobile terminal and the infotainment system connected via a Universal Serial Bus (USB).

13. The system for Bluetooth pairing according to claim 11, wherein the information of the infotainment system for the Bluetooth pairing includes a Media Access Control (MAC) address of the infotainment system or information for a Bluetooth module disposed in the infotainment system.

14. The system for Bluetooth pairing according to claim 11, wherein after the storing of the information to the NFC tag by the dedicated APP, the program instructions when executed are further configured to:
activate a NFC function of the mobile terminal;
tag the mobile terminal to the NFC tag that stores the information;
obtain the information by the tagging by the mobile terminal; and
execute a connection screen for the Bluetooth pairing based on the obtained information by the mobile terminal.

15. The system for Bluetooth pairing according to claim 14, wherein the connection screen is a screen on which the information of the infotainment system is displayed, to Bluetooth Pair the infotainment system and the mobile terminal as a result of a selection made using a mobile terminal.

* * * * *